(12) United States Patent
Saxena et al.

(10) Patent No.: US 12,047,271 B2
(45) Date of Patent: Jul. 23, 2024

(54) METHOD AND SYSTEM FOR INTEROPERABILITY OF SOFTWARE DEFINED WIDE AREAS NETWORKS (SD-WANs)

(71) Applicant: INFOSYS LIMITED, Bangalore (IN)

(72) Inventors: Gaurav Saxena, Mount Laurel, NJ (US); Kishore Babu Thota, Chilakaluripet (IN); Amol Nilkantheshwar Joshi, Pune (IN)

(73) Assignee: INFOSYS LIMITED, Bangalore (IN)

( * ) Notice: Subject to any disclaimer, the term of this patent is extended or adjusted under 35 U.S.C. 154(b) by 305 days.

(21) Appl. No.: 17/704,969

(22) Filed: Mar. 25, 2022

(65) Prior Publication Data

US 2023/0308382 A1 Sep. 28, 2023

(30) Foreign Application Priority Data

Mar. 24, 2022 (IN) .............................. 202241016762

(51) Int. Cl.
*H04L 45/02* (2022.01)
*H04L 12/46* (2006.01)
*H04L 45/50* (2022.01)

(52) U.S. Cl.
CPC .......... *H04L 45/02* (2013.01); *H04L 12/4633* (2013.01); *H04L 45/50* (2013.01)

(58) Field of Classification Search
None
See application file for complete search history.

(56) References Cited

U.S. PATENT DOCUMENTS

2020/0322262 A1* 10/2020 Maino ..................... H04L 67/04

* cited by examiner

*Primary Examiner* — Christine T Duong
(74) *Attorney, Agent, or Firm* — Troutman Pepper Hamilton Sanders LLP (Rochester)

(57) ABSTRACT

Embodiments of the present disclosure discloses a method and an interoperability system. The present disclosure aims to provide interoperability between SD-WANs of different vendors. The interoperability system uses information from an agent (software or hardware) installed in network terminals such as routers of each SD-WAN to configure control and management plane signals and configures the agent associated with one SD-WAN to share data with agent associated with another SD-WAN. Therefore, the present disclosure helps in interoperability between SD-WANs from different vendors. Hence, operations are efficient, and cost is reduced.

17 Claims, 7 Drawing Sheets

US 12,047,271 B2

METHOD AND SYSTEM FOR INTEROPERABILITY OF SOFTWARE DEFINED WIDE AREAS NETWORKS (SD-WANs)

This application claims the benefit of Indian Patent Application No. 202241016762, filed Mar. 24, 2022, which is incorporated by reference in its entirety.

TECHNICAL FIELD

The present disclosure relates in general to computer networking. Particularly, but not exclusively, the present disclosure relates to method and system for interoperability of SDWANs.

BACKGROUND

Software-defined WAN (SD-WAN) is a technology that applies the key Software Defined Network (SDN) principles to Wide Area Network (WAN). SD-WAN minimizes delays over long distances between nodes and provide predictable service quality over often unpredictable links. SD-WAN makes network decisions using both centralized control policies and knowledge of local conditions throughout distributed network, such as local service quality measurements and the availability of bandwidth on links. As service providers deploy virtual services for enterprise and Small Office/Home Office (SOHO) customers, they face an entirely new set of challenges mainly around SD-WAN vendor solutions interconnectivity which happens during service providers/enterprises mergers and acquisitions.

The existing SD-WAN solutions focus on building proprietary solution limited to closed network environment without scope for interconnectivity with other SD-WAN vendor solutions. Therefore, the enterprises hosting SD-WANs from different vendors cannot exchange data. Enterprises use siloed and closed discrete network services that have overhead of high operating expenditures and capital expenditures in terms of operations & management.

The information disclosed in this background of the disclosure section is only for enhancement of understanding of the general background of the invention and should not be taken as an acknowledgment or any form of suggestion that this information forms the prior art already known to a person skilled in the art.

SUMMARY

Additional features and advantages are realized through the techniques of the present disclosure. Other embodiments and aspects of the disclosure are described in detail herein and are considered a part of the claimed disclosure.

Disclosed herein is a method for providing interoperability between enterprise Software Defined Wide Area Networks (SD-WANs), the method comprising discovering one or more enterprise Software Defined Wide Area Networks (SD-WANs) from a plurality of onboarded enterprise SD-WANs; determining a deployment model of the one or more enterprise SD-WANs; deploying a Cross-Connect Interworking Virtualized network function (CIV) agent in one or more network terminals in the one or more enterprise SD-WANs based on the deployment model of the one or more enterprise SD-WANs; configuring the CIV agent in each of the one or more network terminals in the one or more enterprise SD-WANs to establish secure tunnels with the system and exchange route information for data flow, and establish tunnels with the system for exchanging control signals; generating a routing information table based on routing information received from the CIV agent of each of the one or more network terminals in the one or more enterprise SD-WANs and Virtual Network Functions (VNF) of the one or more enterprise SD-WANs; and establishing the secure tunnels between the CIV agent of the one or more network terminals in the one or more enterprise SD-WANs for enabling data flow between the one or more enterprise SD-WANs based on the routing table information.

In an embodiment, the present disclosure discloses an interoperability system. The interoperability system comprises a Cross-Connect Interworking Virtualized network function (CIV) manager an interconnect controller. The CIV manager is configured to discover one or more enterprise Software Defined Wide Area Networks (SD-WANs) from a plurality of onboarded enterprise SD-WANs; determine a deployment model of the one or more enterprise SD-WANs; and deploy a Cross-Connect Interworking Virtualized network function (CIV) agent in one or more network terminals in the one or more enterprise SD-WANs based on the deployment model of the one or more enterprise SD-WANs. The interconnect controller is configured to configure the CIV agent in each of the one or more network terminals in the one or more enterprise SD-WANs to establish secure tunnels with the system and exchange route information for data flow, and establish tunnels with the system for exchanging control signals; generating a routing information table based on routing information received from the CIV agent of each of the one or more network terminals in the one or more enterprise SD-WANs and Virtual Network Functions (VNF) of the one or more enterprise SD-WANs; and establish the secure tunnels between the CIV agent of the one or more network terminals in the one or more enterprise SD-WANs for enabling data flow between the one or more enterprise SD-WANs based on the routing table information.

In an embodiment, the present disclosure discloses a non-transitory computer readable medium. The computer readable medium stores instructions which when processed by at least one processor cases a device to perform operations. The operations comprises discovering one or more enterprise Software Defined Wide Area Networks (SD-WANs) from a plurality of onboarded enterprise SD-WANs; determine a deployment model of the one or more enterprise SD-WANs; deploying a Cross-Connect Interworking Virtualized network function (CIV) agent in one or more network terminals in the one or more enterprise SD-WANs based on the deployment model of the one or more enterprise SD-WANs; configuring the CIV agent in each of the one or more network terminals in the one or more enterprise SD-WANs to establish secure tunnels with the system and exchange route information for data flow, and establish tunnels with the system for exchanging control signals; generating a routing information table based on routing information received from the CIV agent of each of the one or more network terminals in the one or more enterprise SD-WANs and Virtual Network Functions (VNF) of the one or more enterprise SD-WANs; and establishing the secure tunnels between the CIV agent of the one or more network terminals in the one or more enterprise SD-WANs for enabling data flow between the one or more enterprise SD-WANs based on the routing table information The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
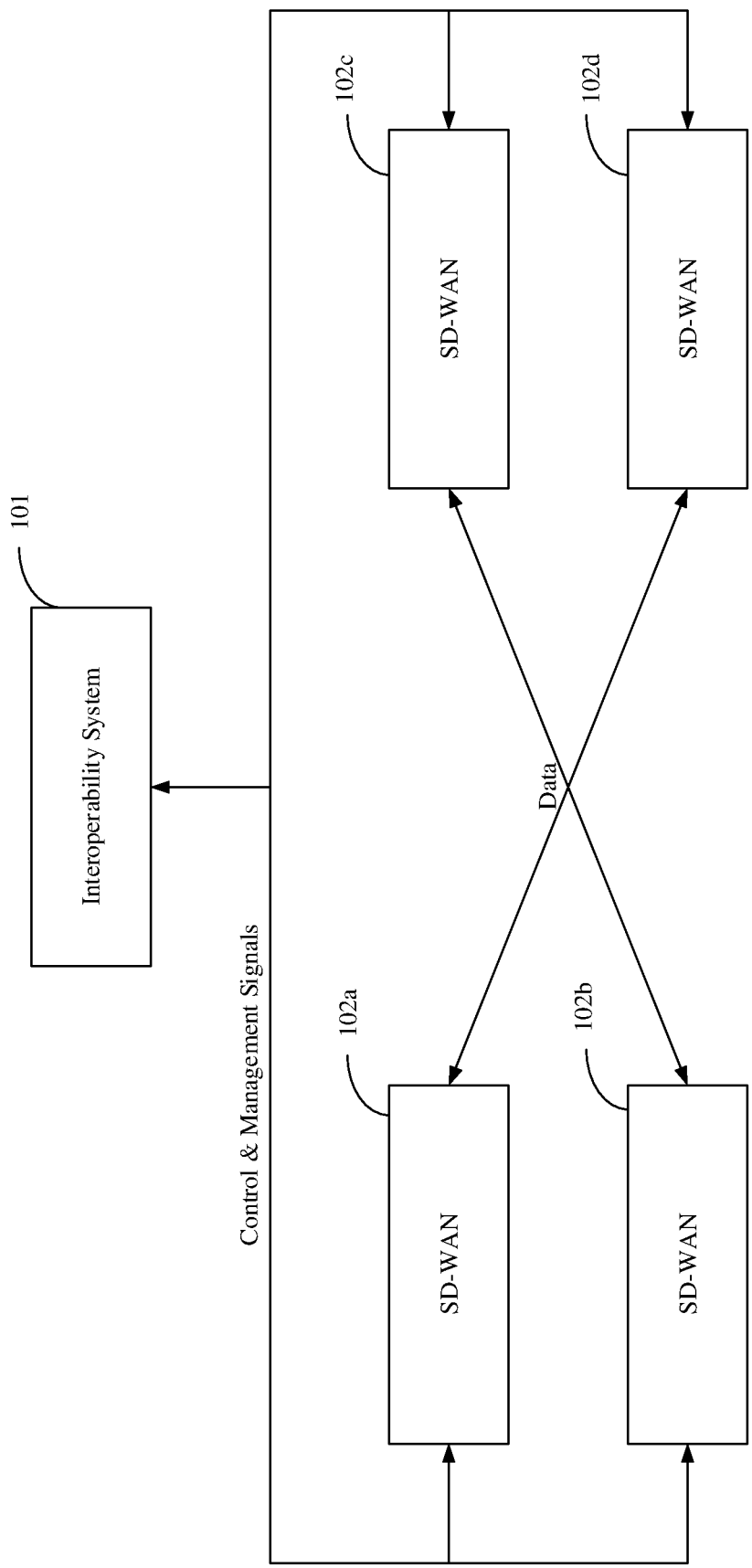
FIG. 1 shows a high-level architecture illustrating interoperability of Software Defined-Wide Area Networks (SD-WANs), in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes, which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure discloses a method and an interoperability system. The present disclosure aims to provide interoperability between Software Defined-Wide Area Networks (SD-WANs) of different vendors. The interoperability system uses information from an agent (software or hardware) installed in network terminals such as routers of each SD-WAN to configure control and management plane signals and configures the agent associated with one SD-WAN to share data with agent associated with another SD-WAN.

FIG. 1 shows a high-level architecture (100) illustrating interoperability of Software Defined-Wide Area Network (SD-WAN). FIG. 1 discloses an interoperability system (101), and a plurality of SD-WANs (102a, 102b, 102c, 102d). The plurality of SD-WANs can include n number of SD-WANs and FIG. 1 discloses only four SD-WANs for illustrative purpose. the count of SD-WANs should not be considered as a limitation. As depicted, the plurality of SD-WANs are connected to the interoperability system (101). In an embodiment, the plurality of SD-WANs are onboarded with the interoperability system (101). In an embodiment, the plurality of SD-WANs (102a, 102b, 102c, 102d) may be from different vendors. For example, the plurality of SD-WANs (102a, 102b, 102c, 102d) may be associated with a single enterprise having multiple branches. Each branch may host a different vendor specific SD-WAN, which are traditionally not communicable. The interoperability system (101) enables to connect the SD-WANs from different vendors with an SD-WAN overlay network and use virtualized functions such as advanced security or WAN optimization. The plurality of SD-WANs (102a, 102b, 102c, 102d) from different vendors may be registered with the interoperability system (101). Registering with the interoperability system (101) means allowing SD-WAN network terminals, such as router or switches installed in branch sites, to avail services provided by the interoperability system (101).

In an embodiment, each SD-WAN may include one or more network terminals. The one or more network terminals (also referred as universal Customer Premise Equipment (uCPE) devices) may be software and/or hardware enabled devices that provide network functionalities to the SD-WAN. In one illustration the one or more network terminals are virtual functions deployed on a central server (not shown) or on a public cloud.

In an embodiment, each branch site may be connected to further branch sites, which may or may not use SD-WAN from same vendor as of the SD-WAN used in the branch site. While the same vendor SD-WAN solution provides overlay network between the SD-WANs having provided by the vendor, the interoperability system (101) provides overlay network between the SD-WANs from different vendors, therefore connecting the enterprise system irrespective of the SD-WAN vendor.

The architecture of FIG. 1 comprises a management plane, a control plane and a data plane. Optionally, the architecture can include an orchestration plane which helps in the onboarding procedure of the plurality of SD-WANs (102a, 102b, 102c, 102d) from different vendors. The onboarding procedure may include authenticating and authorizing the one or more network terminals of each SD-WAN with the interoperability system (101). The management plane may be responsible for configuring and monitoring the network. The control plane may be responsible for routing traffic between the plurality of SD-WANs (102a, 102b, 102c, 102d). The control plane may also be responsible for sharing secret key with the one or more network terminals. The data plane may be responsible for forwarding data packets based on the route generate by the control plane.

Figure 2:
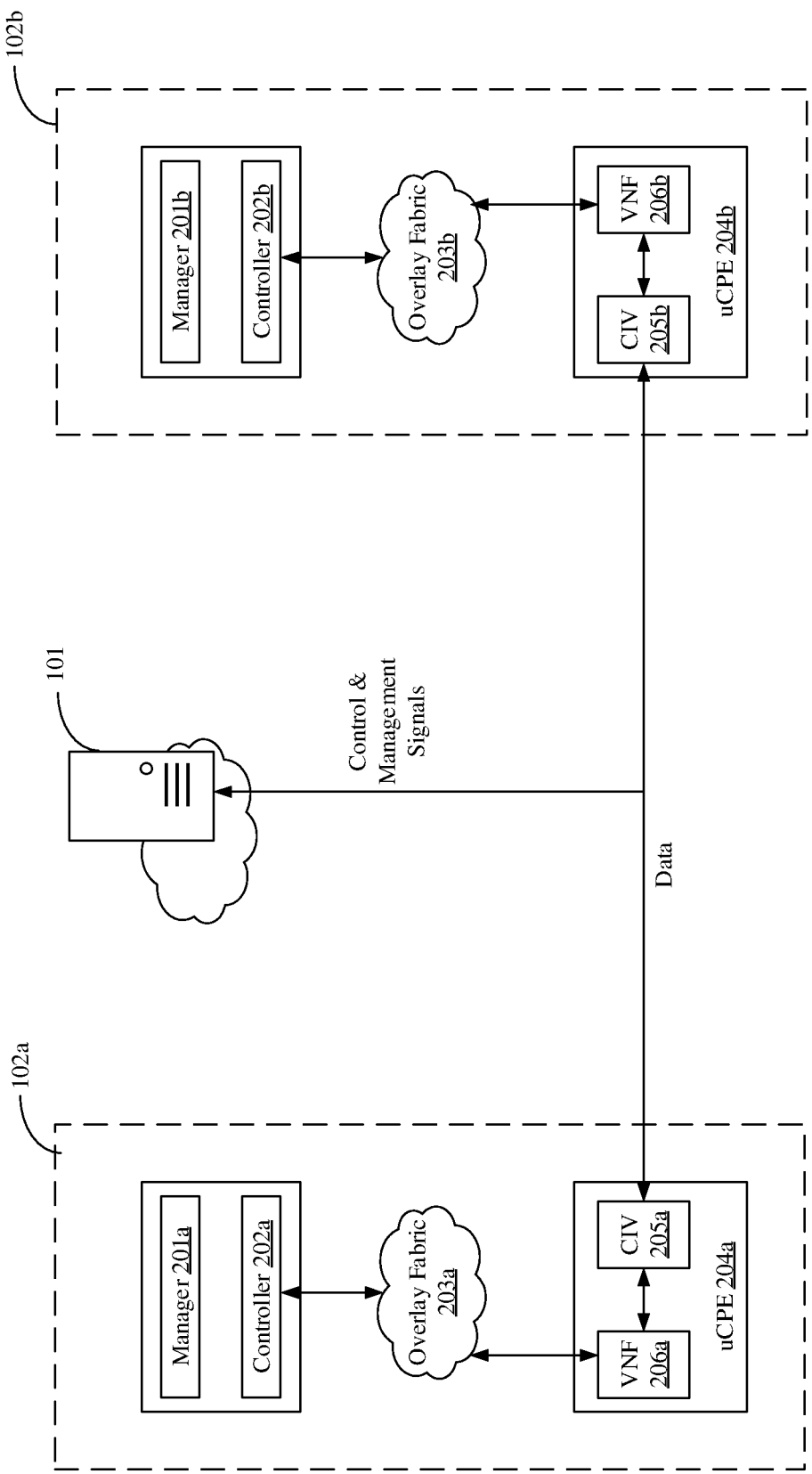
FIG. 2 shows a detailed architecture illustrating interoperability of SD-WANs, in accordance with some embodiments of the present disclosure.

Referring now to FIG. 2, detailed illustration of the architecture provided. The architecture includes the interoperability system (101), a pair of SD-WANs (102a, 102b) installed at respective network sites. In an embodiment, the network site may include a branch network, a home network, and so forth. Each network site may include the one or more network terminals (204a, 204b). The network terminal (204a) may be installed in the SD-WAN (102a) and the network terminal (204) may be installed in the SD-WAN (102b). Each SD-WAN (102a, 102b) may include respective manager (201a, 201b) and controller (202a, 202b). The manager (202a, 201b) may be responsible for carrying out the functions of the management plane and orchestration plane among the SD-WAN provided by the same vendor. Likewise, the controller (202a, 202b) may be responsible for carrying out control plane functions among the SD-WAN provided by the same vendor. For simplicity, FIG. 2 shows the network architecture having two SD-WAN networks from different vendors. However, the network architecture can include more than two SD-WAN networks from different vendors. Each SD-WAN network can be further connected to other SD-WAN networks from same or different vendors. Each SD-WAN (102a, 102b) implements respective overlay fabric (203a, 203b). the overlay fabric is an overlay path on the underlay path. The underlay path may include a Multiprotocol Label Switching (MPLS) service, a broadband service and a 3GPP service. The one or more network terminals (204a, 204b) may be edge devices that connects the respective SD-WAN to the interoperability system (101). For example, the SD-WAN (102a) may include endpoint devices such as mobile, laptops, servers, Internet of Things (IoT) devices and the like. Further, the SD-WAN (102a) may include site routing device such as routers, switches that connects the endpoint devices.

The one or more network terminals (204a) may connect the site routing device to the interoperability system (101). Generally, the edge device is a physical router or a switch having physical network function or virtual network function. The virtual function of the edge device is commonly known as the uCPE and the uCPE is referred as the network terminal in the present disclosure. As shown in the FIG. 2, the uCPE (204a, 204b) comprises a Virtual Network Function (VNF) (206a, 206b) of the vendor SD-WAN (102a, 102b) respectively. The VNF (206a, 206b) are software instances of the functions of the edge devices. That is, the VNF (206a, 206b) provide network services for the edge devices. The VNF (206a, 206b) are configured according to routing policy developed by the controller (202a, 202b). The uCPE (204a, 204b) further includes a Cross-connect Interconnect Virtualized network function (CIV) agent (205a, 205b) respectively. The CIV agent (205a, 205b) enables connection of the SD-WAN (102a, 102b) with the interoperability system (101). The CIV agent (205a, 205b) may interact with the VNF (206a, 206b) via Application Program Interface (API). The CIV agent (205a, 205b) may obtain the routing information, data packets from the VNF (206a, 206b) and transmit to the interoperability system (101). The CIV agent (205a, 205b) also helps in establishing secure tunnels between the uCPE (204a, 204b) and the interoperability system (101) and between the CIV agent (205a, 205b).

In an embodiment, the interoperability system (101) may be deployed on a cloud server. For example, the interoperability system (101) may be hosted on a hypervisor, a Virtual Machine (VM) or in a docker container.

Figure 3:
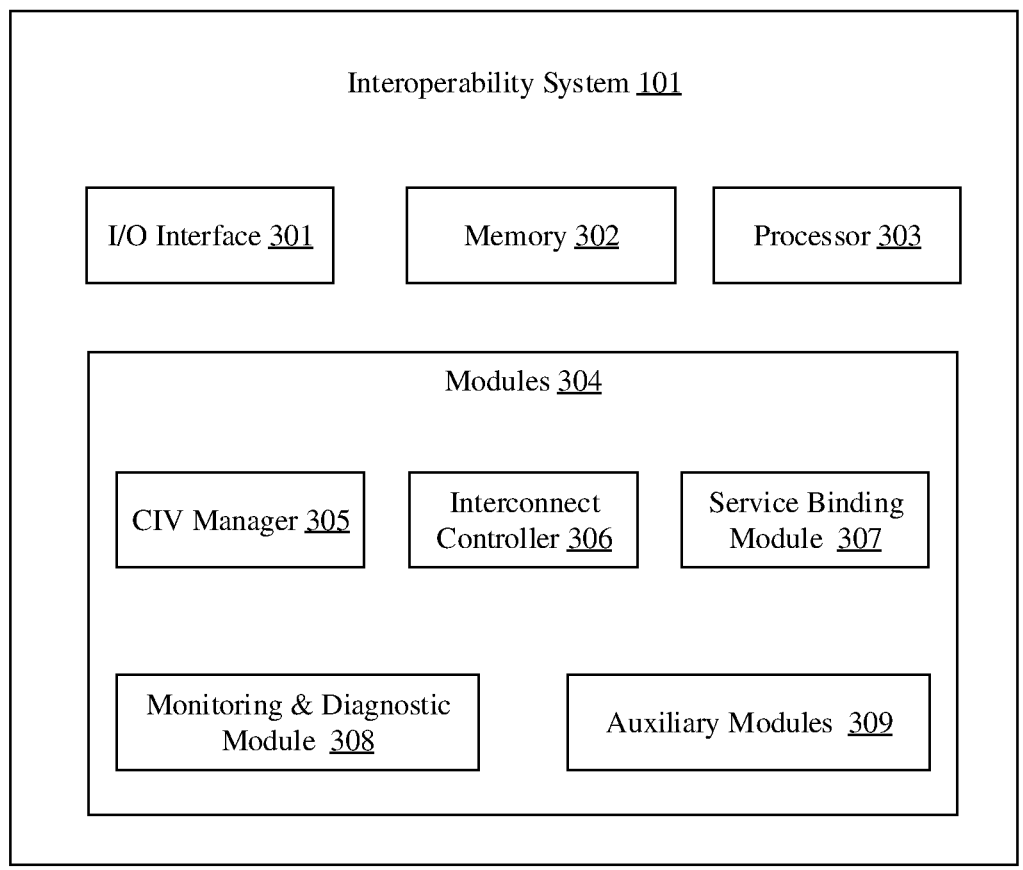
FIG. 3 shows a block diagram of an interoperability system, in accordance with some embodiments of the present disclosure.

Reference is now made to FIG. 3 which shows a block diagram of the interoperability system (101). The interoperability system (101) may include Central Processing Unit ("CPU" or "processor") (303), a memory (302) storing instructions executable by the processor (303). The processor (303) may include at least one data processor for executing program components for executing user or system-generated requests. The memory (302) may be communicatively coupled to the processor (303). The interoperability system (101) further includes an Input/Output (I/O) interface (301). The I/O interface (301) may be coupled with the processor (203) through which an input signal or/and an output signal may be communicated.

In some embodiments, the interoperability system (101) comprises modules (304). The modules (304) may be stored within the memory (302). In an example, the modules (204) are communicatively coupled to the processor (303) and may also be present outside the memory (302) as shown in FIG. 3 and implemented as hardware. As used herein, the term modules (304) may refer to an application specific integrated circuit (ASIC), a Field Programmable Gate Array (FPGA), an electronic circuit, a processor (303) (shared, dedicated, or group), and memory (302) that execute one or more software or firmware programs, a combinational logic circuit, and/or other suitable components that provide the described functionality. In some other embodiments, the modules (304) may be implemented using at least one of ASICs and FPGAs. In an embodiment, an Input/Output (I/O) interface (301) may enable communication between the interoperability system (101) and the CIV agent (205a, 205b).

In one implementation, the modules (304) may include, for example, a CIV manager (305), an interconnect controller (306), a service binding module (307), a monitoring and diagnostic module (308) and auxiliary modules (309). It may be appreciated that such aforementioned modules (304) may be represented as a single module or a combination of different modules (304).

In an embodiment the CIV manager (305) is configured for deployment of the CIV agent (205a, 205b), provisioning and activation of the CIV agent (205a, 205b), backup configuration, upgrade and decommissioning of the CIV agent (205a, 205b). The CIV manager (305) is further configured to manage plurality of CIV agents (205a, 205b). In an embodiment, the CIV manager (305) deploys the CIV agent (205a, 205b) based on deployment configuration of the SD-WAN (102a, 102b). Further, the CIV manager (305) provisions the CIV agent (205a, 205b) to establish secure tunnels. Further, the CIV manger (305) activates the CIV agent (205a, 205b) to interact with the VNF (206a, 206n), collect route information, share it with the interconnect controller (306) and transmit data packets to other CIV agent (e.g., 205b).

In an embodiment, deployment, provisioning and activation forms the onboarding procedure of the uCPE (204a, 204b). In one embodiment, during onboarding procedure, the VNF (206a, 206b) may dynamically procure IP address and register with the interoperability system (101). In one embodiment, Zero Touch Provisioning (ZTP) may be used for deployment and provisioning of the CIV agent (205a, 205b). The VNF (206a, 206b) may be identified by the CIV manager (305) using unique ID associated with them. For example, chassis ID and certificate serial number. Further, the CIV manager (305) may also be responsible for authenticating the VNF (206a, 206b) while registering the uCPE (204a, 204b). Authentication may be performed using root certificate and serial number associated with the VNF (206a, 206b). When the interoperability system (101) is hosted in public clouds such as Azure or AWS, the CIV manager (305) is also responsible for back-up and recovery. When the interoperability system (101) is hosted in private clouds or on premise, the CIV manager (305) may not be responsible for backup and recovery. Customer may have to perform this task. Further, the CIV manager (305) is also responsible for decommissioning the CIV agent (205a, 205b).

In an embodiment, the interconnect controller (306) is configured to establish secure tunnels with the CIV agent (205a, 205b). Further, the interconnect controller (306) is configured to receive local routes information from the CIV agent (205a, 205b). Based on the local route information, the interconnect controller (306) is configured to generate a Forwarding Information Base (FIB) (also referred as route information table in the present disclosure). Based on the FIB, the routes are also pushed to the CIV agent (205a, 205b) for configuring routes for data flow.

The service binding module (307) may be configured to inform the interconnect controller (306) to expect a control connection from the CIV (205a, 205b) after activating the CIV (205a, 205b). The service binding module (307) may further be configured to establish the connectivity between CIV (205a, 205b) and the VNF (206a, 206b).

In an embodiment, the monitoring and diagnostic module (308) is configured to monitor the network and diagnose network issues. In one instance the monitor and diagnose module (308) is configured to diagnose onboarding issues. For example, the monitoring and diagnostic module (308) may verify if the VNF (206a, 206b) have established secure control connection with the interconnect controller (306) via the CIV (205a, 205b). In another instance, the authentication may be monitored if the correct device properties are used. Likewise, when a route encounters failure, the monitoring and diagnostic module (308) is configured to determine a different route to transmit the data packets.

In an embodiment, the auxiliary modules (309) may include APIs for interaction between different components of the interoperability system (101), between the interoperability system (101) and the CIV agent (205a, 205b) and between the CIV agent (205a, 205b) and VNF (206a, 206b). Further, the auxiliary modules (309) may include adaptors for different vendor SD-WANs.

Figure 4:
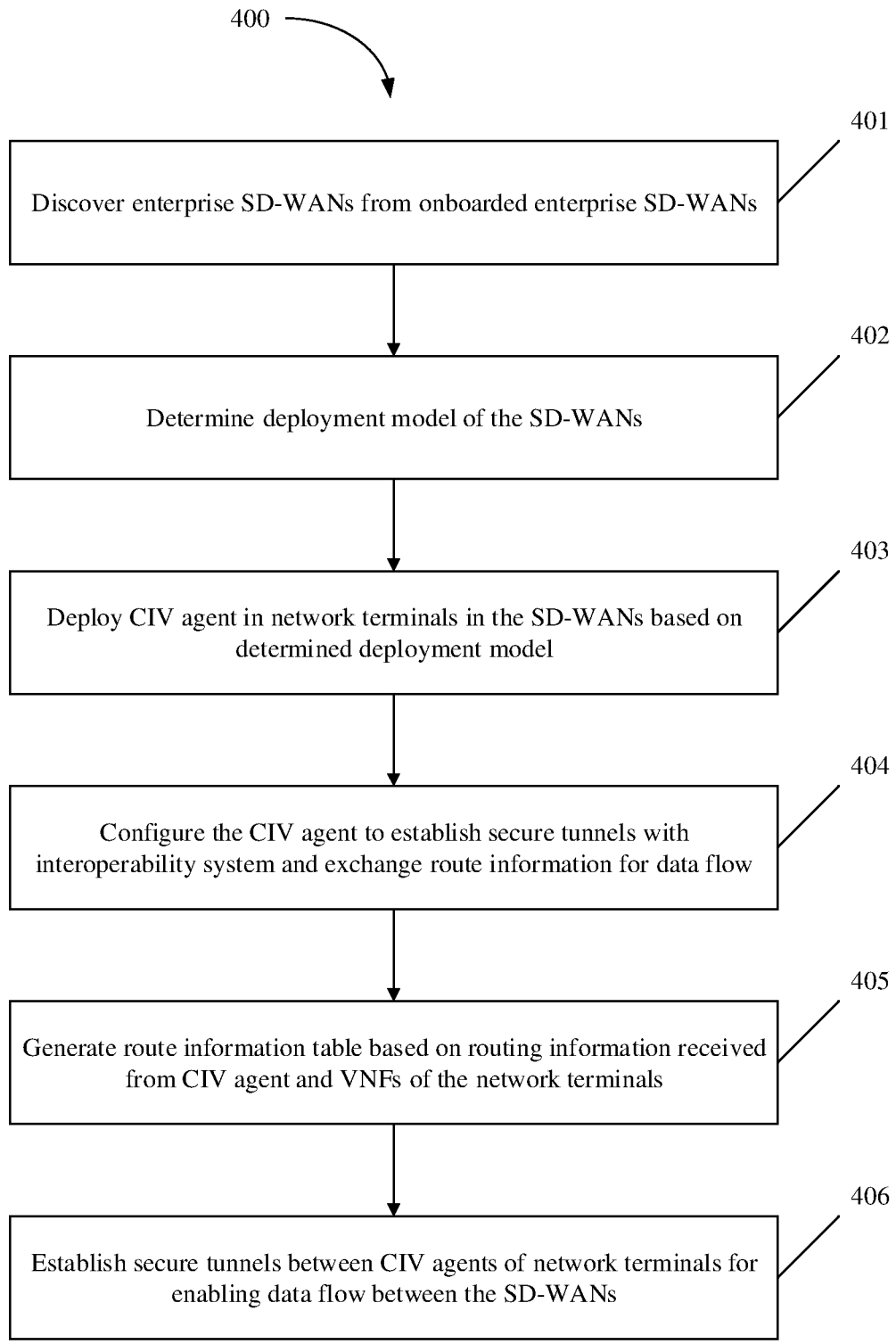
FIG. 4 shows a flowchart illustrating method steps for interoperability of SD-WANs, in accordance with some embodiments of the present disclosure.

FIG. 4 shows a flowchart illustrating a method for interoperability of SD-WANs, in accordance with some embodiment of the present disclosure. The order in which the method (400) may be described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At step (401), discovering enterprise SD-WANs from onboarded enterprise SD-WANs (102a, 102b, 102c, 102d). Discovering process involves identifying the SD-WANs (102a, 102b) from the plurality of SD-WANs (102a, 102b, 102c, 102d). Each SD-WAN may be associated with a unique ID. The onboarded SD-WANs can be discovered using NorthBound (NB) APIs such as Restful APIs. NB APIs link the interoperability system (101) with the SD-WAN (e.g., 102a). In an embodiment, other discovery protocols may be used to discover the one or more SD-WANs (102a, 102b) from the plurality of SD-WANs (102a, 102b, 102c, 102d).

Figure 5A:
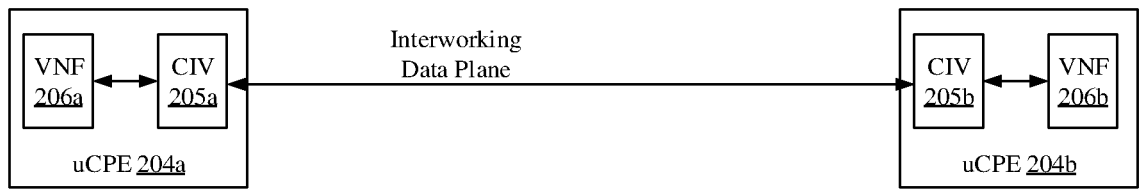
FIG. 5a, FIG. 5b and FIG. 5c show deployment models of Cross-connect Interconnect Virtualized network function (CIV) agent in universal Customer Premise Equipment (uCPE) of SD-WANs, in accordance with some embodiments of the present disclosure.
Figure 5B:
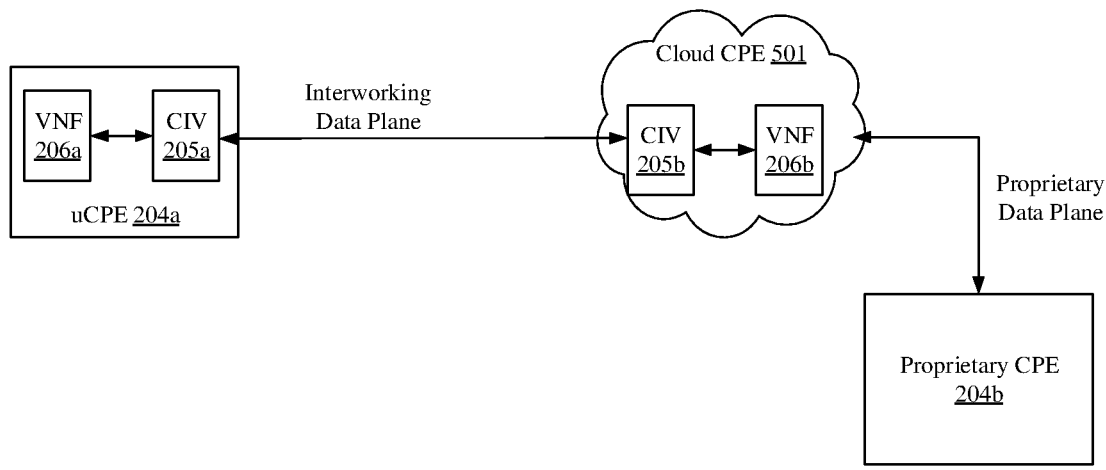
Figure 5C:
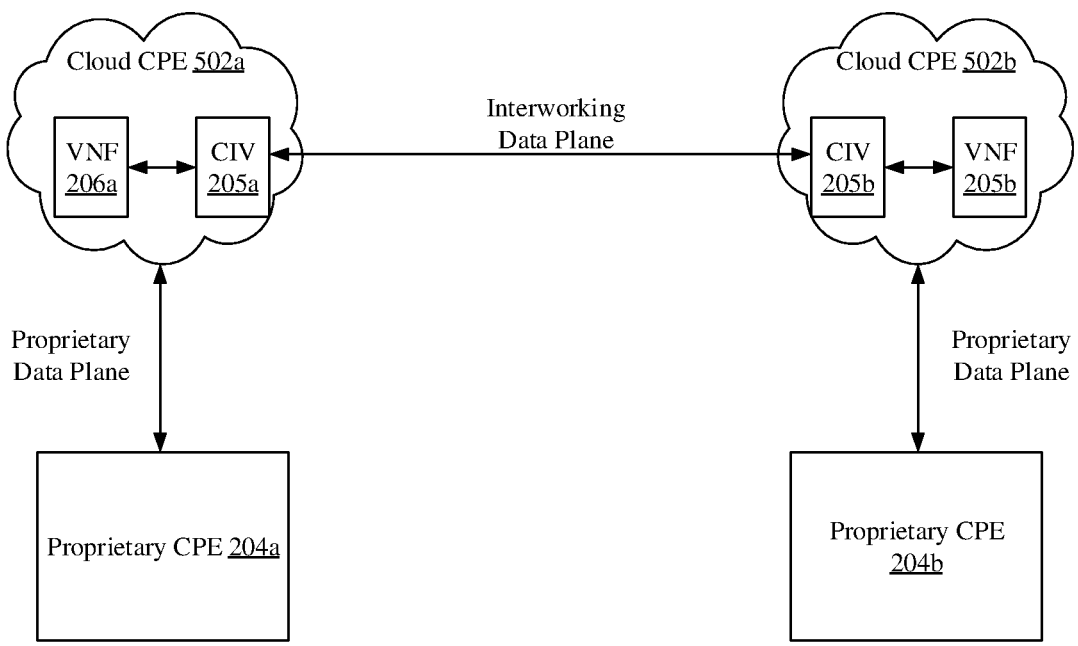

At step (402), determining deployment model of the one or more SD-WANs (102a, 102b). The one or more SD-WANs (102a, 102b) may be deployed in different ways. Reference is now made to FIG. 5a, FIG. 5b and FIG. 5c, which show different deployment models of the SD-WAN. As shown in the FIG. 5a, the SD-WAN (102a, 102b) may be deployed in general purpose hardware (uCPE) (204a, 204b) which allows seamless connectivity with the interoperability system (101). The general purpose uCPE allows to avail services from external network other than the vendor services. Therefore, such uCPE allows deployment for service functions from other vendors. FIG. 5b is an illustration where the SD-WAN (102a) is a general purpose uCPE but the SD-WAN (102b) is a proprietary CPE (vCPE). The vCPE has a proprietary data plane as compared to generic data plane in the uCPE. Therefore, a new service needs to be added on top of the proprietary vCPE service to integrate with the interoperability system (101). An intermediate cloud CPE (501) (also referred as CIV gateway) service may be added on top of the vCPE service to integrate the SD-WAN (102b) with the interoperability system (101). The intermediate cloud CPE (501) may be a public cloud infrastructure, which can avail third-party vendor services. Now referring to the FIG. 5c, both the SD-WANs (102a, 102b) have vCPEs. Therefore, both the SD-WANs (102a, 102b) host the intermediate cloud CPE (502a, 502b) to provide access to third-party vendor services.

At step (403), deploying the CIV agent (205a, 205b) based on the determined deployment model of the one or more SD-WANs (102a, 102b). Referring back to FIG. 5a, the CIV agent (205a, 205b) are deployed in uCPE (204a, 204b). As the uCPE (204a, 204b) allows external vendor services, the CIV agent (205a, 205b) are installed in the uCPE (204a, 204b). In an embodiment, the CIV agent (205a, 205b) are deployed in the cloud CPE (501, 205a, 502b)

when at least one of the SD-WAN (102*b* in FIGS. 5*b*, 102*a* and 102*b* in FIG. 5*c*) have the vCPE (102*b* in FIGS. 5*b* and 102*a* and 102*b* in FIG. 5*c*).

At step (404), after the CIV agent (205*a*, 205*b*) are installed, provisioned and activated, the configuring the CIV agent (205*a*, 205*b*) to establish secure tunnels with the system and exchange route information for data flow. In an embodiment, the CIV agent (205*a*, 205*b*) established the secure tunnels with the interconnect controller (206) for sharing control and management signals with the interoperability system (101). In an embodiment, the secure tunnels includes one of, the MPLS service, the broadband service and the 3GPP service. In one instance, the secure tunnels may be IPsec or VPN.

Figure 6A:
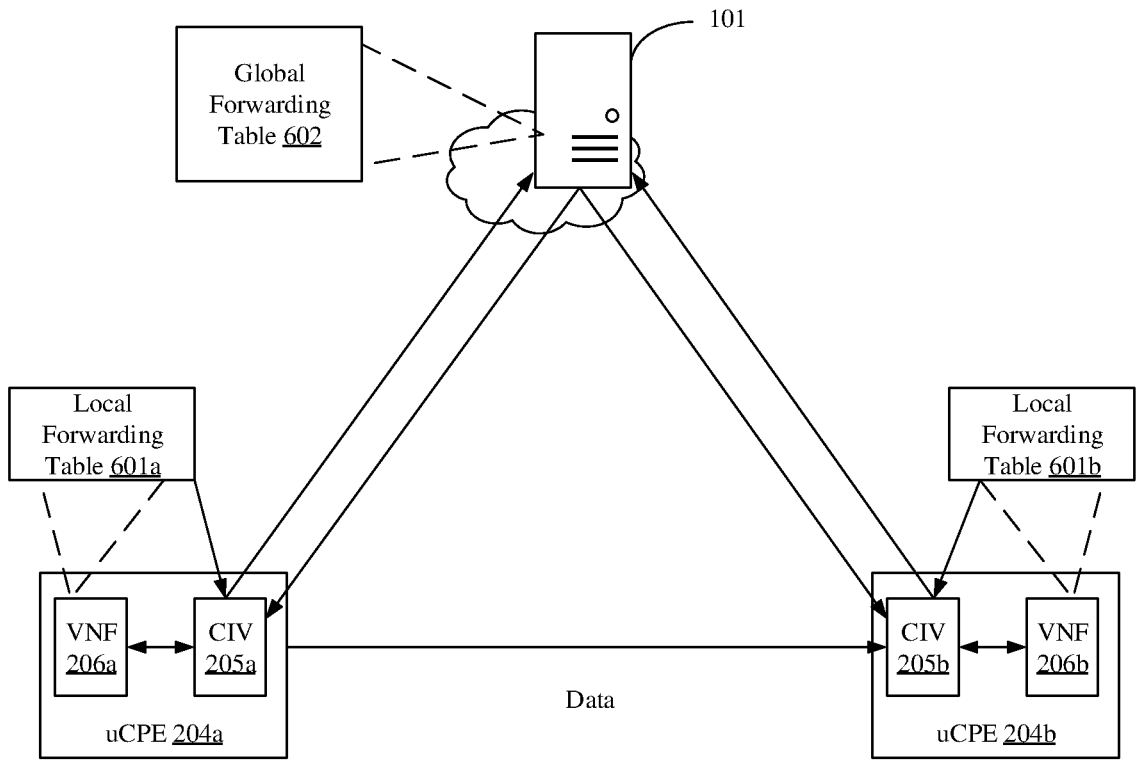
FIG. 6a shows an exemplary illustration of routing between enterprise SD-WANs, in accordance with some embodiments of the present disclosure.
Figure 6B:
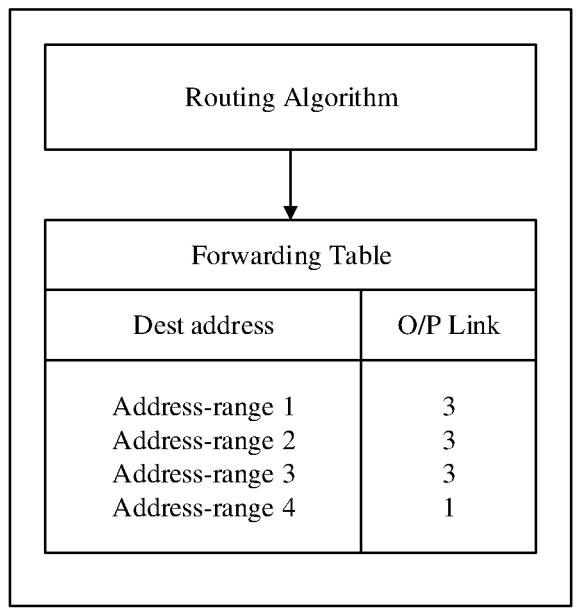
FIG. 6b show exemplary table of Forwarding Information Base (FIB), in accordance with some embodiments of the present disclosure.

At step (405), generating route information table (FIB) based on routing information received from the CIV agent (205*a*, 205*b*) and VNF (206*a*, 206*b*). Reference is now made to FIG. 6*a*, which shows an exemplary illustration of exchanging route information between the CIV agent (205*a*, 205*b*) with the interoperability system (101). The CIV agent (205*a*, 205*b*) interact with the VNF (206*a*, 206*b*) to obtain local route information (local forwarding table) regarding respective SD-WANs (102*a*, 102*b*). For example, when end devices in the SD-WAN (102*a*, 102*b*) initiate sharing data with branch sites, the local forwarding table (601*a*, 601*b*) is created in respective SD-WANs. The local forwarding table (601*a*, 601*b*) may include output link (port number) referring to the VNF (206*a*, 206*b*). The CIV agent (205*a*, 205*b*) obtains this information and transmits to the interoperability system (101). The interoperability system (101) receives this information and generates the FIB for global transmission of data packets. In other words, the interoperability system (101) generates a global forwarding table (602) which indicates a path for routing the data packets between the SD-WANs (102*a*, 102*b*). Referring now to FIG. 6*b*, an exemplary forwarding table is illustrated. As shown, a routing algorithm determines one or more ports associated with the SD-WANs (102*a*, 102*b*). Further, the routing algorithm determines an input port and an output port for each of the SD-WANs (102*a*, 102*b*) based on the routing information received from respective CIV agent (205*a*, 205*b*) and VNFs (206*a*, 206*b*) where the routing information comprises an Internet Protocol (IP) address. From the FIG. 6*b*, the destination address may be the IP address of the recipient SD-WAN. Furthermore, the routing algorithm generates the routing path between the input port and the output port for data flow between the one or more enterprise SD-WANs.

At step (406), establishing the secure tunnels between the CIV agent (205*a*, 205*b*) for enabling data flow between the SD-WANs (102*a*, 102*b*). The data packets are then transmitted via the secure tunnels thereby transferring data between SD-WANs of different vendors.

In an embodiment, the proposed method and system provides seamless integration with multiple SD-WANs from different vendors. There exists increased operational efficiency and reduced capital expenditure.

Figure 7:
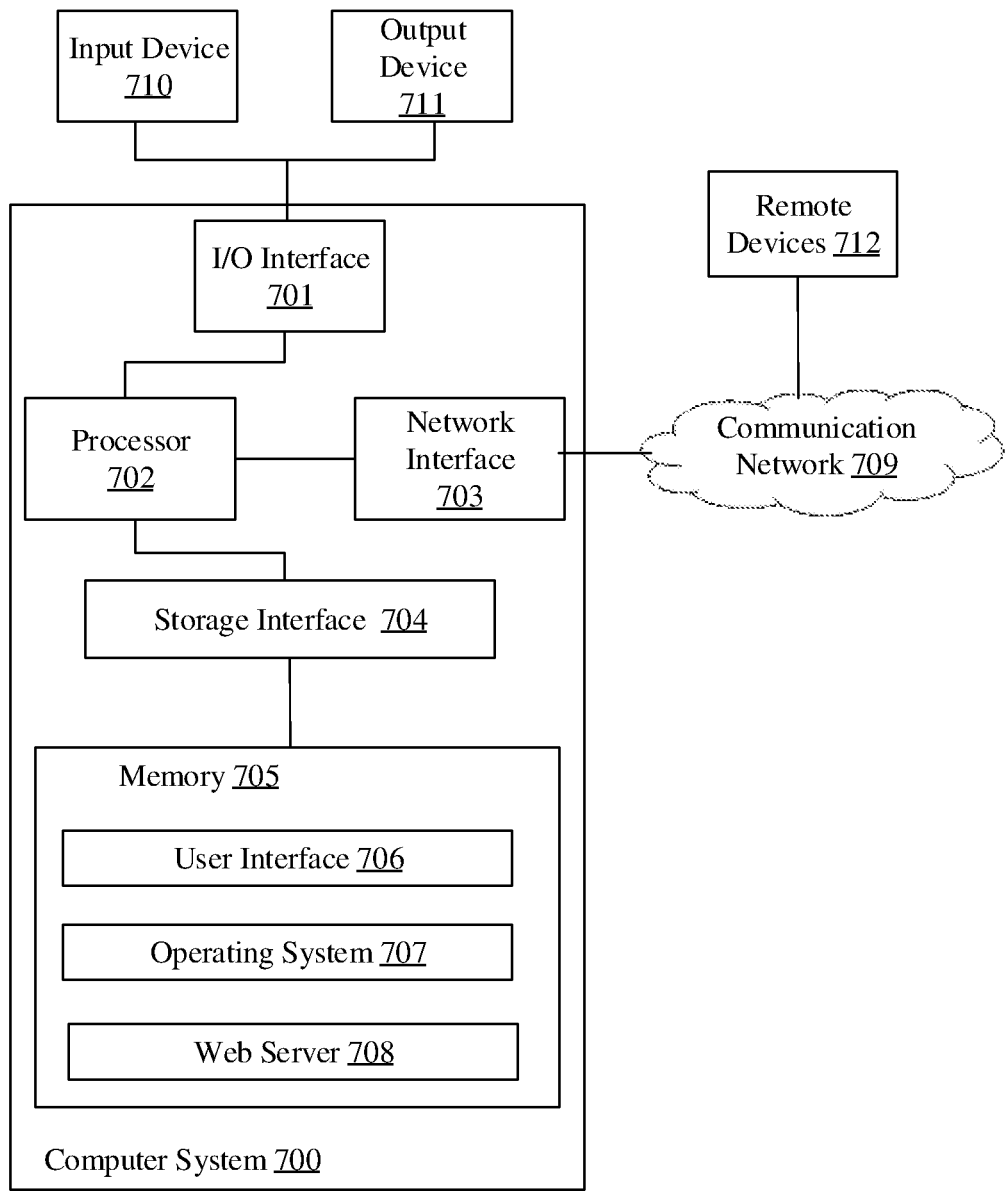
FIG. 7 shows a block diagram of a general-purpose computer for interoperability of SD-WANs, in accordance with an embodiment of the present disclosure.

FIG. 7 depicts a block diagram of a general-purpose computer for interoperating SD-WANs (102*a*, 102*b*), in accordance with an embodiment of the present disclosure. The computer system (700) may comprise a central processing unit ("CPU" or "processor") (702). The processor (702) may comprise at least one data processor. The processor (702) may include specialized processing units such as integrated system (bus) controllers, memory management control units, floating point units, graphics processing units, digital signal processing units, etc. The computer system (700) may be analogous to the interoperability system (101).

The processor (702) may be disposed in communication with one or more input/output (I/O) devices (not shown) via I/O interface (701). The I/O interface (701) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (701), the computer system (700) may communicate with one or more I/O devices. For example, the input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (711) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (700) is connected to the remote devices (712) through a communication network (709). The remote devices (712) may be SD-WANs (102*a*, 102*b*). The processor (702) may be disposed in communication with the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network (709) may include, without limitation, a direct interconnection, local area network (LAN), wide area network (WAN), wireless network (e.g., using Wireless Application Protocol), the Internet, etc. Using the network interface (703) and the communication network (709), the computer system (700) may communicate with the scene remote devices (712). The network interface (703) may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network (709) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, 3GPP and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor (702) may be disposed in communication with a memory (707) (e.g., RAM, ROM, etc. not shown in FIG. 7) via a storage interface (704). The storage interface (704) may connect to memory (707)

including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (707) may store a collection of program or database components, including, without limitation, user interface (706), an operating system (707), web server (708) etc. In some embodiments, computer system (700) may store user/application data, such as, the data, variables, records, etc., as described in this disclosure. Such databases may be implemented as fault-tolerant, relational, scalable, secure databases such as Oracle® or Sybase®.

The operating system (707) may facilitate resource management and operation of the computer system (700). Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system (700) may implement a web browser (708) stored program component. The web browser (708) may be a hypertext viewing application, for example MICROSOFT® INTERNET EXPLORER™ GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers (708) may utilize facilities such as AJAX™, DHTML™, ADOBE® FLASH™, JAVASCRIPT™, JAVA™, Application Programming Interfaces (APIs), etc. In some embodiments, the computer system (700) may implement a mail server stored program component. The mail server may be an Internet mail server such as Microsoft Exchange, or the like. The mail server may utilize facilities such as ASP™ ACTIVEX™, ANSI™ C++/C#, MICROSOFT®, .NET™, CGI SCRIPTS™, JAVA™, JAVASCRIPT™, PERL™ PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system (700) may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD (Compact Disc) ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices, which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is, therefore, intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

We claim:

1. A computer implemented method for providing interoperability between enterprise Software Defined Wide Area Networks (SD-WANs), wherein the method is performed by an interoperability system, the method comprising:
  discovering one or more enterprise Software Defined Wide Area Networks (SD-WANs) from a plurality of onboarded enterprise SD-WANs;
  determining a deployment model of the one or more enterprise SD-WANs;
  deploying a Cross-Connect Interworking Virtualized network function (CIV) agent in one or more network terminals in the one or more enterprise SD-WANs based on the deployment model of the one or more enterprise SD-WANs;
  configuring the CIV agent in each of the one or more network terminals in the one or more enterprise SD-WANs to establish secure tunnels with the interoperability system and exchange route information for data flow;
  generating a routing information table based on routing information received from the CIV agent of each of the one or more network terminals in the one or more enterprise SD-WANs and Virtual Network Functions (VNF) of the one or more enterprise SD-WANs; and
  establishing the secure tunnels between the CIV agent of the one or more network terminals in the one or more enterprise SD-WANs for enabling data flow between the one or more enterprise SD-WANs based on the routing table information.

2. The method of claim 1, wherein the deployment model of the one or more enterprise SD-WANs is one of:
  wherein the one or more network elements is a universal Customer Premise Equipment (uCPE) configured to communicate with each other via respective CIV agent; and
  wherein at least one of the one or more network elements is a proprietary CPE and configured to communicate with the interoperability system via respective CIV gateway.

3. The method of claim 1, wherein the CIV agent is deployed in the one or more network terminals as a VNF.

4. The method of claim 1, wherein deploying the CIV agent in the one or more network terminal based on the deployment model of the one or more enterprise SD-WANs comprises:
  deploying the CIV agent in the one or more network terminal, when the one or more network elements is a universal Customer Premise Equipment (uCPE); and
  deploying the CIV agent in a cloud CPE, when the one or more network terminal is a proprietary CPE, wherein the cloud CPE is associated with the proprietary CPE.

5. The method of claim 1, wherein the secure tunnels includes one of, a Multiprotocol Label Switching (MPLS) service, a broadband service and a 3GPP service.

6. The method of claim 1, wherein generating the routing information table comprises:
  determining one or more ports associated with the one or more network elements;
  determining an input port and an output port for each of the one or more network terminals based on the routing information received from respective CIVs and VNFs, wherein the routing information comprises an Internet Protocol (IP) address; and
  generating a routing path between the input port and the output port for data flow between the one or more enterprise SD-WANs.

7. An interoperability system for interoperability of Software Defined Wide Area Network (SD-WAN), the interoperability system (101) comprising:
  a Cross-Connect Interworking Virtualized network function (CIV) manager configured to:
    discover one or more enterprise Software Defined Wide Area Networks (SD-WANs) (102a, 102b) from a plurality of onboarded enterprise SD-WANs;
    determine a deployment model of the one or more enterprise SD-WANs; and
    deploy a Cross-Connect Interworking Virtualized network function (CIV) agent in one or more network terminals in the one or more enterprise SD-WANs based on the deployment model of the one or more enterprise SD-WANs;
    and
  an interconnect controller configured to:
    operate the CIV agent in each of the one or more network terminals in the one or more enterprise SD-WANs to establish secure tunnels with the interoperability system and exchange route information for data flow;
    generate a routing information table based on routing information received from the CIV agent of each of the one or more network terminals in the one or more enterprise SD-WANs and Virtual Network Functions (VNF) of the one or more enterprise SD-WANs; and
    establish the secure tunnels between the CIV agent of the one or more network terminals in the one or more enterprise SD-WANs for enabling data flow between the one or more enterprise SD-WANs based on the routing table information.

8. The interoperability system of claim 7, wherein the interconnect controller determines the deployment model of the one or more enterprise SD-WANs as one of:
  wherein the one or more network elements is a universal Customer Premise Equipment (uCPE) configured to communicate with each other via respective CIV agent; and
  wherein at least one of the one or more network elements is a proprietary CPE and configured to communicate with the system via respective CIV gateway.

9. The interoperability system of claim 7, wherein the CIV agent is deployed in the one or more network terminals as a VNF.

10. The interoperability system of claim 7, wherein the interconnect controller deploys the CIV agent in the one or more network terminal based on the deployment model of the one or more enterprise SD-WANs, wherein the interconnect controller is configured to:
  deploy the CIV agent in the one or more network terminal (204a, 204b) when the one or more network elements is a universal Customer Premise Equipment (uCPE); and
  deploy the CIV agent in a cloud CPE when the one or more network terminal is a proprietary CPE, wherein the cloud CPE is associated with the proprietary CPE.

11. The interoperability system of claim 7, wherein the secure tunnels includes one of, a Multiprotocol Label Switching (MPLS) service, a broadband service and a 3GPP service.

12. The interoperability system of claim 7, wherein the interconnect controller generates the routing information table, wherein the interconnect controller is configured to:
  determine one or more ports associated with the one or more network elements;
  determine an input port and an output port for each of the one or more network terminals based on the routing information received from respective CIVs and VNFs, wherein the routing information comprises an Internet Protocol (IP) address; and generate a routing path between the input port and the output port for data flow between the one or more enterprise SD-WANs.

13. A non-transitory computer readable medium for interoperability of Software Defined Wide Area Network (SD-WAN), having stored thereon one or more instructions stored thereon that when processed by at least one processor cause a device to perform operations comprising:
discovering one or more enterprise Software Defined Wide Area Networks (SD-WANs) from a plurality of onboarded enterprise SD-WANs;
determining a deployment model of the one or more enterprise SD-WANs;
deploying a Cross-Connect Interworking Virtualized network function (CIV) agent in one or more network terminals in the one or more enterprise SD-WANs based on the deployment model of the one or more enterprise SD-WANs;
configuring the CIV agent in each of the one or more network terminals in the one or more enterprise SD-WANs to establish secure tunnels with the interoperability system and exchange route information for data flow;
generating a routing information table based on routing information received from the CIV agent of each of the one or more network terminals in the one or more enterprise SD-WANs and Virtual Network Functions (VNF) of the one or more enterprise SD-WANs; and
establishing the secure tunnels between the CIV agent, of the one or more network terminals in the one or more enterprise SD-WANs for enabling data flow between the one or more enterprise SD-WANs based on the routing table information.

14. The non-transitory computer readable medium of claim 13, wherein the instructions causes the device to deploy the CIV agent when the deployment model of the one or more enterprise SD-WANs is one of:
wherein the one or more network elements is a universal Customer Premise Equipment (uCPE) configured to communicate with each other via respective CIV agent; and
wherein at least one of the one or more network elements is a proprietary CPE and configured to communicate with the interoperability system (101) via respective CIV gateway.

15. The non-transitory computer readable medium of claim 13, wherein the instructions causes the device to deploy the CIV agent in the one or more network terminals as a VNF.

16. The non-transitory computer readable medium of claim 13, wherein instructions causes the device to deploy the CIV agent in the one or more network terminal based on the deployment model of the one or more enterprise SD-WANs, wherein the instructions causes the device to perform operations comprising:
deploying the CIV agent in the one or more network terminal, when the one or more network elements is a universal Customer Premise Equipment (uCPE); and
deploying the CIV agent in a cloud CPE, when the one or more network terminal is a proprietary CPE, wherein the cloud CPE is associated with the proprietary CPE.

17. The non-transitory computer readable medium of claim 13, wherein the secure tunnels includes one of, a Multiprotocol Label Switching (MPLS) service, a broadband service and a 3GPP service.

* * * * *